Nov. 7, 1950  R. H. COLOMY ET AL  2,528,580
REEL DRIVING SYSTEM
Filed May 15, 1945
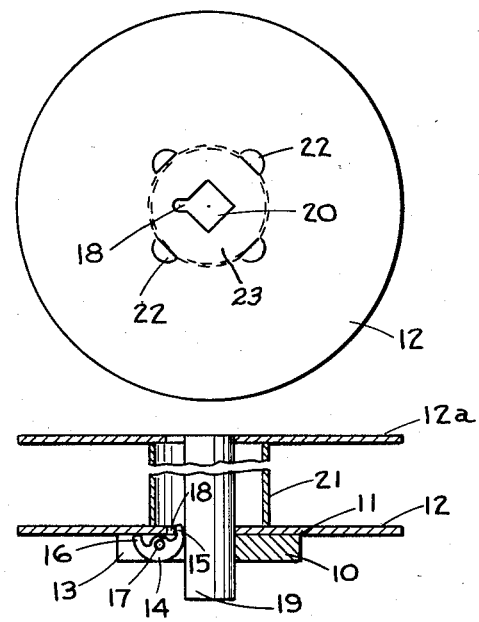
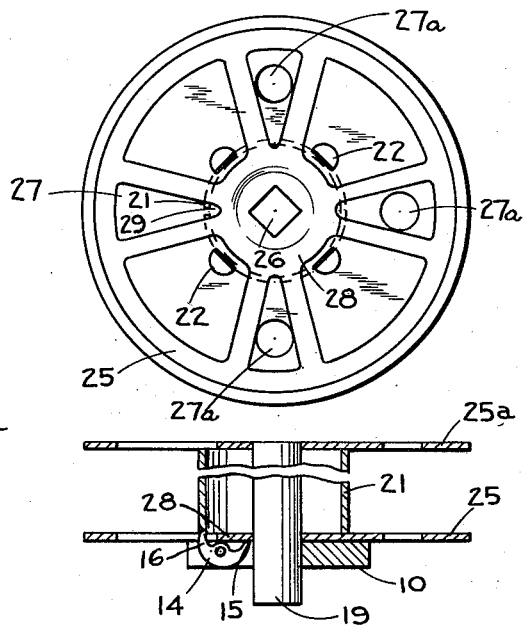
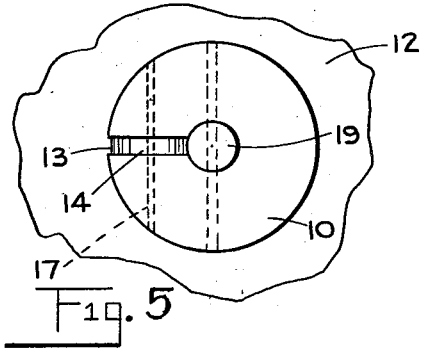
INVENTORS,
ROY H. COLOMY
BY CHARLES J. BOENISCH
VanDeventer & Grier
ATTORNEYS Patented Nov. 7, 1950

2,528,580

UNITED STATES PATENT OFFICE 2,528,580

REEL DRIVING SYSTEM

Roy H. Colomy, Springdale, and Charles J. Boenisch, Norwalk, Conn., assignors to Pratt & Gray Company, Inc., a corporation of Connecticut Application May 15, 1945, Serial No. 593,888

7 Claims. (Cl. 242—70)

This invention relates to reel driving systems. In such systems there is usually a shaft on which reels having a hollow core are placed and to which they are secured so as to rotate with the shaft, so that the reels can be wound with wire, paper, cloth, photographic film or any other material wound on reels.

A common difficulty is to provide a shaft and associated driving parts that will accommodate reels that differ in the way they are driven and mounted. If the reels are made with square center holes so a square shaft can be used to drive them, obviously they cannot be used with round shafts. Locking nuts on the shafts are objectionable, as are keyways in the reel cores and keys in the shaft, or vice versa. Devices which require adjustment and resetting are troublesome and unsatisfactory, besides costly.

The present invention, therefore, has for its objects the provision of a reel driving system wherein commercial reels of different types, and that differ in the way they are driven, may be driven on the same apparatus without adjusting or resetting the driving apparatus.

Another object is to provide a reel driving system wherein placing a reel in winding position automatically connects it for rotation, regardless of the radial spacing of the driving connection to the reel from the axial center thereof.

A further object is to provide a reel driving system wherein a plurality of driving means is provided, and wherein the reel being wound automatically determines which of said plurality of means is used to drive the reel, all other driving means being rendered ineffective.

Other objects and advantages will be apparent from the following specification and drawings, wherein for the sake of illustrating a preferred embodiment of the invention is disclosed in connection with a reel driving system for film reels as used in cameras, projectors, microfilm readers and the like. Obviously, the system can be used to drive reels for any purpose, and many modifications in the construction and arrangement of the parts here shown can be made by those skilled in the art without however departing from the scope of the appended claims.

In the accompanying drawings:

Figure 1 is a side view of a reel to be used with the driving mechanism constituting this invention;

Figure 2 is a view partly in section, of the reel Figure 1 and the driving system therefor;

Figure 3 is a side view of another type of reel;

Figure 4 is a view partly in section of the reel Figure 3 and the driving mechanism therefor;

Figure 5 is an end view of the shaft, rotary member and driving means for the reels shown in Figures 1 and 4.

Referring to Figs. 1 and 2, the numeral 10 denotes a rotary member, the surface 11 of which contacts the head 12 of a reel which is supported thereby. The rotary member has a radial slot 13 therein in which is positioned a driving means, such as the pawl 14 which has the teeth 15, 16, and which is secured to the member 10 by a pin 17. The head 12 of the reel has an aperture 18 therein adapted to receive tooth 15 of the pawl 14 when the reel head 12 is in contact with the inner surface 11 of the member 10.

The member 10 can be rotated in any suitable manner, such as by shaft 19 to which it is secured. This shaft may extend upwards and through the aperture 20 in the core of the reel, and out beyond the upper head 12$^a$ thereof.

The heads, such as 12, of such reels are commonly made of metal, fibre or the like. The cores, such as 21, are commonly made of metal and have ears 22 which project through the heads and are turned over thereon to secure the heads to the core. The core and heads may be constructed and joined in any suitable manner.

The reel shown in Figure 1 is a common type having fibre heads and a metal core. The heads are punched as shown at 18, 20 and have no other openings therein. Consequently, when one of these reels is placed against member 10, the tooth 16 of pawl 14 is pushed inwardly by the imperforate portion 23 of the head. This moves pawl 14, and the tooth 15 thereof moves outwardly and enters the aperture 18, and the reel is revolved thereby, together with member 10 and shaft 19.

In Figs. 3 and 4 is shown a different type of reel in common use. This reel usually has metal heads, one of which is shown at 25. These heads are apertured for shaft 19 as shown at 26. They may also have triangular cut-out portions at 27 and circular cut-out portions at 27$a$ to lighten them. The center part 28 of these heads about the shaft hole are imperforate. When one of these reels is placed against member 10, the tooth 15 of pawl 14 is pushed inwardly by the imperforate portion 28 of the head. This moves pawl 14 and the tooth 16 thereof moves outwardly and enters one of the apertures 27 at 29, and the reel is revolved thereby, together with member 10 and shaft 19.

The holes 20, 26, when square as shown, will fit on machines having square shafts which will drive them without using the invention here described. However, these same reels are used on machines having round shafts, and then the instant invention is used, as some means must be provided with round-shaft machines to grasp the reel or otherwise couple it to the revolving shaft. The instant invention accomplishes this with a minimum of parts and without requiring any adjustment when handling either type of reel shown.

What is claimed is:

1. In a reel driving system, a shaft, a member secured to said shaft and having a radial slot therein, a double-toothed pawl movably mounted in said slot, said teeth being adapted to alternately extend outwardly from said member as said pawl is moved whereby one of said teeth may be extended to engage and transmit driving motion to a reel, and a reel on said shaft, said reel having an opening therein radially spaced from the axis thereof and adapted to be entered by said extended tooth of said pawl so that said reel may be driven thereby, said reel having a surface adapted to abut the other of said teeth to move said pawl and to hold said extended tooth thereof in reel-engaging position.

2. In a reel driving system, a rotary member having a reel contacting surface, driving means including a pawl carried by said member and adapted to project from said contacting surface thereon at at least two points to engage and drive a reel axially aligned with said member, a reel having a hollow core and flanged heads thereon, one of said heads having engaging means therein adapted to selectively engage said driving means at one point to drive said reel thereby, and means on said last head to prevent the engagement of all other of said driving means with said reel.

3. In a reel driving system, a rotary member, driving means including a pawl carried by said member and projecting therefrom at at least two points and adapted to engage and drive a reel axially aligned with said member, a reel having a hollow core and flanged heads thereon, one of said heads having engaging means therein adapted to selectively engage said driving means at one point to drive said reel thereby, and means on said last head to prevent the engagement of all other of said driving means with said reel.

4. In a reel driving system, a rotary member having a reel contacting surface, driving means carried by said member including a pawl having two teeth adapted to project from said contacting surface at two spaced-apart points to engage and drive a reel axially aligned with said member, and a reel having means thereon to selectively engage one of said teeth to be driven thereby, said reel having a head contacting the other of said teeth to prevent the engagement of said reel thereby, whereby said last tooth is rendered ineffective by placing said reel in contact with said member.

5. In a reel driving system, a reel having a head with apertures therein, a shaft for said reel, a member on said shaft having a reel engaging surface, a pawl movably mounted on said member and having two teeth adapted to alternately extend outwardly from said reel engaging surface thereof for engagement with said aperture in said head, whereby pressure via said head on one of said teeth will cause the other of said teeth to project into one of the apertures in said head.

6. In a reel driving system, a reel having a head with apertures therein, a shaft for said reel, a member on said shaft having a radial slot thereon and a pawl movably mounted in said slot and having two teeth adapted to alternately extend outwardly from said member as said pawl is moved by engagement by said head of said reel whereby one of said teeth may be extended to enter one of said apertures in said head and thereby transmit driving motion to said reel mounted on said shaft.

7. In a reel driving system, a shaft, a member having a reel surface carried by said shaft, driving means carried by said member including a pawl having two teeth adapted to alternately project from said contacting surface at spaced-apart points to engage and drive a reel supported on said shaft, a reel having a head and means on said head to selectively engage one of said teeth and means on said head to prevent the engagement of said head with the remaining tooth of said pawl, whereby one of said teeth is automatically rendered ineffective by placing said reel on said shaft and in contact with the contacting surface of said member carried thereby.

ROY H. COLOMY.
CHARLES J. BOENISCH.

REFERENCES CITED

The following references are of record in the file of this patent:

UNITED STATES PATENTS

| Number | Name | Date |
| --- | --- | --- |
| 516,332 | Homer | Mar. 13, 1894 |
| 609,476 | Stickney | Aug. 23, 1898 |
| 1,301,696 | Hess et al. | Apr. 22, 1919 |
| 1,842,718 | Dunlap | Jan. 26, 1932 |
| 2,184,331 | Becker et al. | Dec. 26, 1939 |
| 2,254,605 | Foster | Sept. 2, 1941 |

FOREIGN PATENTS

| Number | Country | Date |
| --- | --- | --- |
| 23,310 | Great Britain | May 2, 1907 |